United States Patent
Heinrich et al.

(10) Patent No.: US 6,818,693 B2
(45) Date of Patent: Nov. 16, 2004

(54) RUBBER COMPOUND FOR TIRE TREAD RUBBER

(75) Inventors: Gert Heinrich, Hannover (DE); Wolfram Herrmann, Wunstorf (DE); Norbert Kendziorra, Garbsen (DE); Thomas Pietag, Stadthagen (DE); Carla Recker, Hannover (DE)

(73) Assignee: Continental Aktiengesellschaft, Hannover ( * ) Notice: Subject to any disclaimer, the term of this patent is extended or adjusted under 35 U.S.C. 154(b) by 189 days.

(21) Appl. No.: 09/994,774

(22) Filed: Nov. 28, 2001

(65) Prior Publication Data

US 2002/0095008 A1 Jul. 18, 2002

(30) Foreign Application Priority Data

Nov. 29, 2000 (DE) .......................... 100 59 236

(51) Int. Cl.$^7$ ................................. C08K 3/34
(52) U.S. Cl. ................. 524/445; 524/447; 524/186; 524/493
(58) Field of Search ............... 524/445, 447, 524/448, 449, 186; 525/333.1, 332.8, 332.9, 333.3, 333.5

(56) References Cited

U.S. PATENT DOCUMENTS

| | | | |
|---|---|---|---|
| 5,250,630 A | * | 10/1993 | Oshima et al. ............ 525/301 |
| 5,360,685 A | | 11/1994 | Tanaka |
| 5,576,372 A | * | 11/1996 | Kresge et al. ............ 524/442 |
| 5,717,000 A | | 2/1998 | Karande et al. |
| 6,034,164 A | * | 3/2000 | Elspass et al. ............ 524/445 |
| 6,103,817 A | | 8/2000 | Usuki et al. |
| 6,598,645 B1 | * | 7/2003 | Larson .................... 152/548 |
| 6,727,311 B2 | * | 4/2004 | Ajbani et al. ............ 524/447 |
| 2003/0032710 A1 | * | 2/2003 | Larson .................... 524/445 |

FOREIGN PATENT DOCUMENTS

| | | |
|---|---|---|
| EP | 1028130 | 8/2000 |
| EP | 1029823 | 8/2000 |
| WO | 97/00910 | 1/1997 |

OTHER PUBLICATIONS

M. Zanetti, S. Lomakin, and G. Camino, "Polymer layered silicate nanocomposites", Macromol. Master. Eng. 279, pp. 1–9 (2000).

J. Schnetger, Encyclopedia of Rubber Technology [Lexikon der Kautschuk–Technik], Hüthig Buch Verlag, 2nd Edition, Heidelberg, 1991, pp. 42–48.

* cited by examiner

*Primary Examiner*—Katarzyna Wyrozebski
(74) *Attorney, Agent, or Firm*—Greenblum & Bernstein, P.L.C.

(57) ABSTRACT

A sulfur-curable rubber compound for a tire tread rubber of, in particular, a racing tire, which compound comprises at least one diene rubber, at least one filler and at least one plasticizer. The rubber compound comprises 5 to 90 phr of at least one layered silicate modified with alkylammonium ions and free of guest molecules that have been polymerized or swelled in by a prior treatment.

30 Claims, No Drawings

RUBBER COMPOUND FOR TIRE TREAD RUBBER

CROSS-REFERENCE TO RELATED APPLICATIONS

The present application claims priority under 35 U.S.C. §119 of German Patent Application No. 100 59 236.8, filed Nov. 29, 2000, the disclosure of which is expressly incorporated by reference herein in its entirety.

BACKGROUND OF THE INVENTION

1. Field of the Invention

The invention relates to a sulfur-curable rubber compound for tire tread rubber, in particular, tire tread rubber of racing tires, which comprises at least one diene rubber, at least one filler, plasticizer, as well as additional common additives. Furthermore, it relates to vehicle tires, in particular, racing tires, the tread rubbers of which contain this rubber compound.

2. Discussion of Background Information

Various fillers, such as carbon black, silica, alumosilicates, kaolin, metal oxides, or chalk, for example, are added to rubber compounds for tire tread rubbers. Due to their specific effect on the rubber the fillers not only help to lower the cost of the rubber compounds but also influence the characteristics of the uncured rubber compound and the tires made therefrom. Active fillers, also called reinforcing fillers, including the majority of carbon blacks, silicas, and the majority of silicates of small particle size, generally improve a number of characteristics of the vulcanized material, such as strength, (tensile) modulus, and tear strength, while other characteristics such as elongation at tear and rebound elasticity are adversely affected. Here, the activity of the filler depends on the particle size, the specific surface area, the geometric shape of the surface, and the chemical composition.

In the past, the known fillers were tested, altered, and modified in multiple ways in order to optimize the characteristics of tires containing these fillers. Additionally, new classes of fillers were developed for this purpose.

Layered silicates from one of these classes of fillers; layered silicates pose the problem that, due to their polar surface they are not compatible with conventional rubber compounds, i.e., they must be modified prior to introducing them into a rubber compound such that they are organophilic and compatible with the surrounding rubber matrix. This is the only way the layered silicate can be well distributed in the rubber matrix. To achieve this, it has been known for a long time to modify the normally hydrophilic surface of the layered silicates by cation exchange using alkyl-ammonium ions in order to render it organophilic. Then the individual organically modified layers are stacked parallel and form small stacks in which organic and inorganic layers alternate regularly.

An overview of nanocomposites based on polymers and layered silicates, their production, characterization, and use can be found, e.g., in the article "Polymer layered silicate nanocomposites" by M. Zanetti, S. Lomakin, and G. Camino in Macromol. Mater. Eng. 279, pp. 1–9 (2000), which is expressly incorporated herein by reference in its entirety.

Four methods for producing nanocomposites based on polymers and layered silicates are described in this article: in-situ polymerization, intercalation of the polymer from a solution, direct intercalation of molten polymer, and sol/gel technology. These processes cause the individual layers of the silicate to be expanded and sometimes even be completely unfoiled (exfoliated). The individual layers have a thickness of approximately 1 nm and are surrounded by polymer. The presence of nanocomposites in polymer materials renders it possible to endow the polymer products made therefrom with new and improved characteristics. The concept of nanocomposites based on layered silicates is used primarily in the area of thermoplasts, in order to improve their characteristics, for example, with respect to tensile strength. The four above-mentioned processes for producing nanocomposites can be used for thermoplasts, while for rubber compounds the direct intercalation of the molten polymer is impossible due to the high viscosity in the conventional processing temperature range. The other three processes can also be used for rubber compounds, however, these processes are technically very cumbersome and invariably involve the use of solvents, which have to be removed entirely in the further course of the processing of such nanocomposites, e.g., for the incorporation into a curable rubber compound.

From WO 97/00910, expressly incorporated herein by reference in its entirety, it is known to produce a latex that contains layered silicate having intercalated emulsion polymer. For the production of such a latex, initially the layered silicate is rendered organophilic by an ion exchange using onium salts and, subsequently, a rubber is emulsion polymerized from its monomers in the presence of the organophilic layered silicate into the layers of the silicate. Thus nanocomposites are formed. After coagulation and drying, such nanocomposites can be used in rubber compounds, e.g., for rubbers of tire innerliners having reduced gas permeability.

U.S. Pat. No. 5,576,372, expressly incorporated herein by reference in its entirety, describes the use of layered silicates in the rubbers of tire innerliners of reduced gas permeability, with the layered silicates being provided with a reactive rubber having positively charged groups. To this end, the layered silicates are treated with a solution containing the reactive rubber, generally a solution having an organic solvent such as toluene. The reactive rubber swells into and between the layers. Subsequently, all solvents must be removed prior to further processing, e.g., the incorporation into a lubber compound of a tire innerliner. Additionally, many organic solvents must be considered ecologically and toxicologically questionable.

Specially treated layered silicates for rubber compounds with improved mechanical characteristics and reduced gas permeability are also known from U.S. Pat. No. 6,103,817, which is expressly incorporated herein by reference in its entirety. Prior to the incorporation into the rubber compounds, the special layered silicates are rendered organophilic by ion exchange using onium salts and, subsequently, additional organic guest molecules are introduced/swelled from organic solvents or by treating the organophilic layered silicates with liquid guest molecules (with substances of low melting point), in order to increase the distance between the layers in the layered silicate and to facilitate and improve the distribution in the rubber compound. One or two different substances may be introduced into the layered silicate, and at least one substance must have polar groups.

The three processes described have in common that prior to the incorporation into a rubber compound, the layered silicates are modified by expensive processes such that prior to incorporation the separate silicate layers have already been separated from one another by lubber molecules so that nanocomposites are present.

From U.S. Pat. No. 6,034,164, expressly incorporated herein by reference in its entirety, it is known to incorporate layered silicates modified with alkylammonium ions directly into a rubber compound made from two special rubbers without any prior swelling or polymerization of rubber or guest molecules. The rubbers in question are, on the one hand, a non-ionic polymer having a molecular weight >50,000 g/mol and, on the other hand, a non-ionic polymer compatible with the first polymer and with a molecular weight lower than that of the first polymer. The forces acting during the mixing process result in layered packages of modified layered silicate having a thickness of more than 10 nm. This is to avoid complete exfoliation. Such rubber compounds may be used for the production of gas impermeable elastomer membranes, such as tire innerliners or bladders.

Rubber compounds used for tire innerliners (main purpose: gas impermeability) are generally insufficient to meet the requirements of rubber compounds of tire tread rubber. For example, the rubber compounds used for tire tread rubber must render the tires optimized with respect to abrasion, skid resistance, rolling resistance, heat build up, tear propagation resistance, and low temperature flexibility. Tread rubber of racing tires for, e.g., race cars or race karts is primarily required to have high skid resistance and good grip at operating temperatures. Such a high skid resistance can be achieved by increasing the dissipation factor tan δ in the relevant temperature range, e.g., by incorporating large amounts (>100 phr) of highly energy-dissipating carbon blacks, so-called racing carbon blacks. Furthermore, it is advantageous for the tires to have a shore hardness as low as possible in the operating temperature range.

SUMMARY OF THE INVENTION

Thus, the present invention is directed to a rubber compound for tire tread rubbers, in particular, tire tread rubbers of racing tires, that can be produced easily and in a manner less harmful to the environment and that provides high skid resistance (high fiction coefficient, good grip) of the tires made therfrom, combined with a reduction in hardness at elevated temperatures.

The present invention provides a sulfur-curable rubber compound for a tire tread rubber which comprises at least one diene rubber, at least one filler, and at least one plasticizer. The rubber compound comprises about 5 to about 90 phr of at least one layered silicate that is modified with alkylammonium ions and is free of guest molecules that have been polymerized or swelled in by a prior treatment.

In one aspect, the sulfur-curable rubber compound contains about 40 to about 85 phr, e.g., about 50 to about 80 phr, of said at least one layered silicate.

In another aspect, the alkylammonium ions comprise ions of the general formula $^+NR_4$, wherein the radicals R are the same or different and at least one radical R is an alkyl group. The radicals R may, for example, be selected from hydrogen, substituted or unsubstituted, saturated or unsaturated, linear or branched alkyl groups having 1 to 40 carbon atoms and substituted or unsubstituted aryl and benzyl groups, provided that at least one radical R is an alkyl group having at least 9 carbon atoms, for example, at least 18 carbon atoms. In another aspect, at least two radicals R are alkyl groups each having at least 14 carbon atoms.

In one exemplary embodiment, all radicals R represent alkyl groups. In another exemplary embodiment, at least two radicals R are alkyl groups having at least 18 carbon atoms.

In still another aspect, the alkylammonium ion of the general formula $^+NR_4$ comprises a total of at least 20 carbon atoms, e.g., at least 30 carbon atoms, and not more than 80 carbon atoms, e.g., not more than 60 carbon atoms.

According to yet another aspect, the alkylammonium of the general formula $^+NR_4$ comprises at least one methyl group. For example, the alkylammonium ion may comprise dimethyl dioctadecyl ammonium.

In another aspect, the modified layered silicate has a carbon content of about 5 to about 50 percent by weight. Also, the layered silicate may comprise individual layers having a thickness ranging from about 0.8 to about 2.0 nm and/or a mean diameter ranging from about 80 to about 800 nm.

In still another aspect of the rubber compound of the present invention, the at least one diene rubber may be selected from natural rubber, synthetic polyisoprene, polybutadiene, styrene-butadiene copolymer and combinations thereof. For example, the at least one diene rubber may comprise cis-1,4-polyisoprene having a 1,4-cis content of more than 90%.

According to yet another aspect of the lubber compound, the at least one plasticizer comprises at least one processing oil in amounts of, e.g., about 2 to about 50 phr.

In another aspect, the rubber compound further comprises up to about 85 phr carbon black, e.g., about 5 to about 50 phr of carbon black, while the total amount of carbon black and layered silicate does not exceed about 90 phr.

In yet another aspect, the sulfur-curable rubber compound of the present invention further contains at least one silane coupling agent, e.g., a bifunctional organosilane having at least one group selected from alkoxy, cycloalkoxy and phenoxy.

The present invention also provides a method of making a tire tread rubber. The method comprises preparing a rubber compound by mixing at least one diene rubber, at least one plasticizer and other conventional components for tire tread rubbers with about 5 to about 90 phr of at least one layered silicate which is modified with alkylammonium ions and free of guest molecules that have been polymerized or swelled in by a prior treatment, forming said compound into a tire tread rubber and curing said compound in the presence of a sulfur vulcanizing agent.

Also provided by the present invention is a vehicle tire, e.g., a racing tire, having a tread rubber which has been made, at least in part, from the sulfur-curable rubber compound according to the present invention as set forth above.

The unit phr (parts per hundred parts of rubber by weight) used herein is the common unit for quantities for compound recipes in the rubber industry. The dosing of the parts by weight of the individual substances is always given herein with respect to 100 parts by weight of the overall mass of all rubbers present in the compound.

Surprisingly, due to the incorporation of the layered silicate modified with alkylammonium ions which has no additional guest molecules incorporated by a prior treatment, into rubber compounds for tread rubber it can be achieved that, compared to conventional carbon black mixtures, the vulcanized materials show a distinct increase of the friction coefficient and, thus, in skid resistance at temperatures above 0° C. and, particularly, at temperatures of approximately 40 to 70° C. encountered in the tread rubber during operation. This effect can be achieved with the cited amounts of layered silicate. Unlike with racing carbon black, it is not necessary to increase the amount of fillers in the compound to high filling levels of more than 100 phr, which is associated with disadvantages in other tire characteristics, such as abrasion and tear propagation resistance.

According to an advantageous embodiment of the invention, the rubber compound comprises at least about 40 phr (e.g., at least about 50 phr) and not more than about 85 phr (e.g., not more than about 80 phr) of the layered silicate. The best results with respect to an improvement of the skid resistance can be achieved with these dosages.

All natural and synthetic layered silicates known to those skilled in the art which are suitable for ion exchange, such as montmorillonites, smectites, china clays, and their mixtures, which occur naturally in the form of various clay minerals (e.g., bentonite and kaolin) can be used as the base material for the modified layered silicates. The individual layers of the layered silicates used preferably have a thickness of 0.8 to 2.0 nm and a mean diameter of 80 to 800 nm. The small, extremely thin platelets can be optimally dispersed in the rubber compound and bonded thereto.

The surface of the layered silicate is modified by a cation exchange with alkylammonium ions having the general formula $^+NR_4$, with the modified layered silicate having a preferred carbon content of about 5 to about 50 percent by weight. The radicals R of the alkylammonium ion used for the modification may be the same or different and preferably are selected from hydrogen, substituted or unsubstituted, saturated or unsaturated, linear or branched alkyl groups having 1 to 40 carbon atoms and substituted or unsubstituted aryl (e.g., phenyl) and aralkyl (e.g., benzyl) groups, with at least one R being a substituted or unsubstituted, saturated or unsaturated alkyl group having more than 8 carbon atoms. In this way, layered silicates are formed with the distance between the individual layers prior to an additional processing or incorporation being about 1.1 to about 5 nm. It is particularly preferred for the layered silicate used for the rubber compound according to the present invention to be modified with a dimethyl dioctadecyl ammonium ion. Layered silicates modified in this way have proven particularly advantageous in improving the skid resistance.

The sulfur-curable rubber compound comprises at least one diene rubber. Diene rubbers comprise any rubber compound having an unsaturated carbon chain that is derived, at least partially, from conjugated dienes. It is particularly preferred for the diene rubber(s) to be selected from at least one of natural rubber, synthetic polyisoprene, polybutadiene, and styrene-butadiene copolymer. These diene elastomers may easily be processed into the rubber compound according to the invention and provide good characteristics of the vulcanized material.

The rubber compound may contain polyisoprene (IR, NR) as diene rubber. This may be either cis-1,4-polyisoprene or 3,4-polyisoprene. However, the use of cis-1,4-polyisoprene having a cis-1,4 content of >90% is preferred. On the one hand, such a polyisoprene may be obtained by stereo-specific solution polymerization with Ziegler-Natta catalysts or by using finely dispersed lithium alkyls. On the other hand, natural rubber (NR) is such a cis-1,4-polyisoprene, having a cis-1,4 content of more than 99%.

When using natural rubber the processing characteristics can be improved and the unvulcanized strength, building tack, notch resistance, and tear propagation resistance of the vulcanized material are increased.

When the rubber compound contains polybutadiene (BR) as diene rubber, it may be cis-1,4- as well as vinyl polybutadiene (40–90% vinyl content). The use of cis-1,4-polybutadiene having a cis-1,4 content larger than 90% is preferred, which may be produced, e.g, by solvent polymerization in the presence of catalysts of the rare earth type.

The styrene-butadiene copolymer may be a solution polymerized styrene-butadiene copolymer (S-SBR) having a styrene content of approximately 10 to 45 percent by weight and a 1,2-content of 10 to 70%, which may be produced, for example, by using lithium alkyls in organic solvents. However, emulsion polymerized styrene-butadiene copolymer (E-SBR) and mixtures of E-SBR and S-SBR may be used as well. The styrene content of E-SBR is approximately 15 to 50 percent by weight and types known from the prior art which are obtained by aqueous emulsion copolymerization of styrene and 1,3-butadiene may, for example, be used. E-SBR in compounds can provide processing improvements compared to S-SBR.

However, in addition to the diene rubbers mentioned, the compound may also contain other types of rubbers, such as styrene-isoprene-butadiene terpolymer, butyl rubber, halobutyl rubber, acrylonitrile-butadiene rubber, hydrogenated acrylonitrile-butadiene rubber, epoxidized natural rubber, hydroxylated natural rubber, or ethylene-propylene-diene rubber (EPDM).

According to an advantageous embodiment of the present invention, the rubber compound comprises about 2 to about 50 phr of at least one processing oil, such as, e.g., mineral oil, in order to optimally adjust the skid resistance and hardness.

The rubber compound according to the present invention may additionally comprise 0 to about 85 phr, preferably about 5 to about 50 phr, carbon black as additional filler, with the sum of the amounts of carbon black and layered silicate in the compound not to exceed about 90 phr. The addition of carbon black provides processing advantages, and carbon black is an inexpensive filler.

In addition to layered silicate and carbon black, the rubber compound according to the invention may include additional fillers known to those skilled in the art such as, e.g., silica, alumina, alumosilicates, chalk, starch, magnesium oxide, titanium dioxide and/or rubber gels.

Advantageously, the rubber compound contains at least one silane coupling agent. The silane coupling agent serves to bond the layered silicate to the surrounding rubber molecules. During the mixing of the rubber and/or the rubber compound (in situ) the silane coupling agent reacts with those surface silanol groups of the layered silicates that are not occupied by alkylammonium ions. Any silane coupling agent known to those skilled in the art for use in rubber compounds and also known for bonding silica to rubber may be used as silane coupling agent. Such coupling agents known from the prior art are bifunctional organosilanes having at least one alkoxy, cycloalkoxy, or phenoxy group as leaving group bonded to the silicon atom and comprising, as further functionality, a group that is capable of undergoing a chemical reaction with the polymer, optionally after cleavage. The latter groups may, for example, be the following chemical groups: —SCN, —SH, —NH$_2$, or —S$_x$— (with x=2–8). Illustrative, non-limiting examples of specific silane coupling agents that may be used are 3-mercaptopropyl triethoxysilane, 3-thiocyanatopropyl trimethoxysilane and 3,3'-bis(triethoxysilylpropyl) polysulfide with 2 to 8 sulfur atoms, such as, e.g., 3,3'-bis(triethoxysilylpropyl) tetrasulfide (TESPT), the corresponding disulfide and a mixture of sulfides with 1 to 8 sulfur atoms having different contents of the various sulfides. TESPT may also be added, for example, as a blend with industrial carbon black (trade name X50S by Degussa). The degree of coupling of the layered silicate to the surrounding rubber molecules may be influenced by the addition of different amounts of layered silicate and, thereby, the intensity of the hysteresis loss and the reinforcing effect and, thus, the skid resistance can be adjusted over a wide range.

Furthermore, the rubber compound according to the invention may contain common additives in conventional percentages. These additives include, e.g., anti-aging agents, such as, e.g., N-phenyl-N'-(1,3-dimethylbutyl)-p-phenylenediamine (6PPD), N-isopropyl-N'-phenyl-p-phenylenediamine (IPPD), 2,2,4-trimethyl-1,2-dihydroquinoline (TMQ), and other substances such as those known from J. Schnetger, *Lexikon der Kautschuktechnik*, 2nd Edition, Hüthig Buch Verlag, Heidelberg, 1991, pp. 42–48, expressly incorporated herein by reference in its entirety, processing aids such as, e.g., zinc oxide and fatty acids such as stearic acid, waxes, and mastication aids such as, e.g., 2,2'-dibenzamido-diphenyldisulfide (DBD).

The vulcanization is performed in the presence of sulfur or sulfur donors where some sulfur donors may simultaneously act as vulcanization accelerators as well. As sulfur donors there may be used, e.g., thiuram derivatives such as tetramethyl thiuramdisulfide and dipentamethylene thiuram tetrasulfide, morpholine derivatives, such as dimorpholyl disulfide, dimorpholyl tetrasulfide, and 2-morpholino-dithiobenzothiazol, as well as caprolactam disulfide. In the last mixing step, sulfur and sulfur donors are added to the rubber compound in the conventional amounts known to those skilled in the art (0.4 to 4 phr sulfur, preferably 1.5 to 2.5 phr sulfur).

The rubber compound of the present invention furthermore may contain substances influencing the vulcanization in conventional amounts, such as vulcanization accelerators, vulcanization retarders, and vulcanization activators, in order to control the required vulcanization temperature and to improve the characteristics of the vulcanized material. The vulcanization accelerators may be selected, for example, from the following groups of accelerators: thiazole accelerators such as, e.g., 2-mercaptobenzothiazole, sulfenamide accelerators such as, e.g., benzothiazyl-2-cyclohexyl sulfenamide, guanidine accelerators, such as, e.g., diphenyl guanidine, thiuram accelerators such as, e.g., tetrabenzyl thiuram disulfide, dithiocarbamate accelerators, such as, e.g., zinc dibenzyldithiocarbamate, amine accelerators, such as, e.g., cyclohexylethylamine, thioureas such as, e.g., ethylene thiourea, xanthogenate accelerators, and disulfides. The accelerators may also be used in combination with one another, which may result in synergistic effects.

The production of the rubber compound according to the present invention is carried out in a conventional manner in one or several mixing steps. Subsequently, the compound is further processed and shaped into the desired form. Then it is vulcanized in a manner known to those skilled in the art, with the resulting products having advantages with respect to tensile modulus, tear propagation resistance, and elongation at tear.

The production of the rubber compound according to the invention is carried out in a conventional manner in one or more mixing steps. Subsequently, it is further processed, e.g., by an extrusion process, and shaped into the respective form of a tread rubber blank. A tread rubber blank produced in this manner is applied in a known fashion during the production of a green cover, in particular, a vehicle pneumatic green cover. However, the tread rubber in the form of a rubber compound strip may also be wound onto a green cover already having all tire parts except for the tread rubber. After the vulcanization of the vehicle tire, the tire shows advantages in skid resistance, which is particularly important for racing tires. It is irrelevant for the tire whether the entire tread rubber has been made from a single compound or has, e.g., a cap and base structure. All that is important is that at least the surface that comes into contact with the road comprises the (vulcanized) rubber compound according to the invention.

In the following the invention is explained in more detail with reference to some exemplary embodiments that are summarized in Table 1 below, but without being limited to these examples.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

In all exemplary compounds contained in Table 1 the quantities given are parts by weight relative to 100 parts by weight of the entire rubber (phr). All compounds could easily be mixed in a process known to those skilled in the art without any problems. Compounds marked C serve as comparison compounds; they contain carbon black. I marks compounds according to the invention which feature a modified layered silicate. Compounds 1 and 2 differ in the rubber used.

The various compounds were vulcanized into test specimens under pressure at 160° C. for optimal vulcanization times which were determined by means of rheometer curves. The material characteristics typical for the rubber industry were determined using these test specimens. The following test procedures were used for examining the test specimens:

tensile strength at room temperature according to DIN 53 504 elongation at tear at room temperature according to DIN 53 504 tensile moduli at 100, 200, and 300% elongation at room temperature according to DIN 53 504 tear strength at room temperature according to DIN 53 504

Shore-A hardness at room temperature and at 70° C. according to DIN 53 505 rebound elasticity at room temperature and at 70° C. according to DIN 53 512 dissipation factor tan $\delta$ at 0, 30, and 60° C. according to DIN 53 513

TABLE 1

|  | Unit | C1 | I1 | C2 | I2 |
|---|---|---|---|---|---|
| Components |  |  |  |  |  |
| natural rubber | phr | 60 | 60 | — | — |
| polybutadiene[1] | phr | 40 | 40 | — | — |
| E-SBR[2] | phr | — | — | 100 | 100 |
| carbon black N220 | phr | 50 | — | 80 | — |
| modified layered silicate[3] | phr | — | 50 | — | 80 |
| aromatic oil | phr | 5 | 5 | 40 | 40 |
| stearic acid | phr | 2 | 2 | 2 | 2 |
| zinc oxide | phr | 3 | 3 | 3 | 3 |
| anti-aging agent | phr | 1 | 1 | 1 | 1 |
| sulfur | phr | 2 | 2 | 2 | 2 |
| accelerator | phr | 2.5 | 2.5 | 2.5 | 2.5 |

TABLE 1-continued

| | Unit | C1 | I1 | C2 | I2 |
|---|---|---|---|---|---|
| Characteristics | | | | | |
| tensile strength | MPa | 20.0 | 9.2 | 15.2 | 3.6 |
| elongation at tear | % | 406 | 497 | 523 | 559 |
| tensile modulus 100% | MPa | 2.96 | 2.52 | 1.35 | 1.11 |
| tensile modulus 200% | MPa | 8.18 | 3.73 | 3.35 | 1.72 |
| tensile modulus 300% | MPa | 15.04 | 5.35 | 6.83 | 2.35 |
| tear strength | N | 31.7 | 21.1 | 27.8 | 10.7 |
| Shore hardness at RT | Shore A | 67.5 | 66.6 | 53.3 | 42.7 |
| Shore hardness at 70° C. | Shore A | 65.7 | 47.0 | 51.2 | 27.9 |
| rebound elasticity at RT | % | 58.1 | 43.7 | 47.0 | 17.0 |
| rebound elasticity at 70° C. | % | 64.5 | 38.1 | 60.6 | 29.2 |
| Dissipation factor tan σ at 0° C. | — | 0.109 | 0.160 | 0.278 | 0.393 |
| Dissipation factor tan σ at 30° C. | — | 0.065 | 0.248 | 0.237 | 0.433 |
| Dissipation factor tan σ at 60° C. | — | 0.061 | 0.210 | 0.194 | 0.334 |

[1]Ubepol 150, Ube Industries, Japan
[2]Type SBR 1500
[3]layered silicate montmorillonite modified with dimethyldioctadecyl-ammonium ions, carbon content approximately 30 percent by weight As seen from Table 1, the hardness of the vulcanized materials made from the compounds according to the invention comprising the layered silicate is lower than that of the respective vulcanized materials made from compounds comprising carbon black, particularly at elevated temperature. Additionally, the compounds according to the invention show a distinct increase in the dissipation factors of the vulcanized materials at 0, 30, and 60° C., compared to the compounds containing only carbon black as a filler. A high dissipation factor correlates with a high friction coefficient and this, in turn, is a gauge for the skid resistance and/or the grip of the tire on the road. The compounds according to the invention are particularly suitable for tires requiring strong grip, such as, e.g., racing tires.

The dissipation factors determined for the compounds I1 and I2 are within a range found in conventional race car tires, the base compounds of the latter having contents of more than 100 phr of highly energy-dissipative carbon blacks. A typical carbon black racing compound shows, e.g., the following dissipation factors: tan δ (0° C.)=0.53; tan δ (30° C.)=0.38; tan δ (60° C.)=0.30. The dissipation factors of the compound I2 at 30° C. and 60° C. are even above these values.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A tire tread comprising a sulfur-curable rubber compound, wherein the rubber compound comprises at least one diene rubber, at least one filler, at least one plasticizer and about 5 phr to about 90 phr of at least one layered silicate modified with alkylammonium ions and free of guest molecules that have been polymerized or swelled in by a prior treatment.

2. The tire tread of claim 1, wherein the at least one layered silicate is present in an amount of at least 40 phr.

3. The tire tread of claim 1, wherein the at least one layered silicate is present in an amount of at least 50 phr.

4. The tire tread of claim 3, wherein the at least one layered silicate is present in an amount of not more than 80 phr.

5. The tire tread of claim 1, wherein said alkylammonium ions comprise ions of general formula $^+NR_4$, wherein the radicals R are the same or different and at least one radical R is an alkyl group.

6. The tire tread of claim 5, wherein the radicals R are selected from hydrogen, saturated or unsaturated, linear or branched alkyl groups having 1 to 40 carbon atoms and aryl and benzyl groups, provided that at least one alkyl group is an alkyl group having at least 9 carbon atoms.

7. The tire tread of claim 5, wherein all radicals R are alkyl groups.

8. The tire tread of claim 5, wherein the at least one radical R is an alkyl group having at least 18 carbon atoms.

9. The tire tread of claim 6, wherein the radicals R comprise at least two alkyl groups having at least 18 carbon atoms.

10. The tire tread of claim 1, wherein said alkylammonium ions comprise a dimethyl dioctadecyl ammonium ion.

11. The tire tread of claim 2, wherein the at least one plasticizer comprises at least one processing oil which is present in an amount of from about 2 phr to about 50 phr.

12. The tire tread of claim 1, wherein the rubber compound further comprises carbon black in an amount of up to 85 phr, with a total amount of carbon black and layered silicate not exceeding 90 phr.

13. A vehicle tire which comprises the tire tread of claim 2.

14. A racing tire which comprises the tire tread of claim 1.

15. A sulfur-curable rubber compound for a tire tread rubber, wherein the rubber compound comprises at least one diene rubber, at least one filler, at least one plasticizer which comprises at least one processing oil in an amount of from about 2 phr to about 50 phr, and about 40 phr to about 90 phr of at least one layered silicate modified with alkylammonium ions and free of guest molecules that have been polymerized or swelled in by a prior treatment.

16. The rubber compound of claim 15, wherein the at least one layered silicate is present in an amount of at least 50 phr.

17. The rubber compound of claim 15, wherein the at least one layered silicate is present in an amount of not more than 85 phr.

18. The rubber compound of claim 16, wherein the at least one layered silicate is present in an amount of not more than 80 phr.

19. The rubber compound of claim 15, wherein said alkylammonium ions comprise ions of general formula $^+NR_4$, wherein the radicals R are the same or different and at least one radical R is an alkyl group.

20. The rubber compound of claim 19, wherein the radicals R are selected from hydrogen, saturated or unsaturated, linear or branched alkyl groups having 1 to 40 carbon atoms and aryl and benzyl groups, provided that at least one alkyl group is an alkyl group having at least 9 carbon atoms.

21. The rubber compound of claim 19, wherein all radicals R are alkyl groups.

22. The rubber compound of claim 19, wherein the at least one radical R is an alkyl group having at least 18 carbon atoms.

23. The rubber compound of claim 20, wherein the radicals R comprise at least two alkyl groups having at least 14 carbon atoms.

24. The rubber compound of claim 15, wherein said alkylammonium ions comprise a dimethyl dioctadecyl ammonium ion.

25. The rubber compound of claim 19, wherein said ions of general formula $^+NR_4$ comprise a total of not less than 20 and not more than 80 carbon atoms.

26. The rubber compound of claim 19, wherein said ions of general formula $^+NR_4$ comprise a total of not less than 30 and not more than 60 carbon atoms.

27. The rubber compound of claim 15, wherein the modified layered silicate has a carbon content of about 5 to about 50 percent by weight.

28. The rubber compound of claim 18, wherein the rubber compound further comprises carbon black in an amount of about 5 to about 50 phr, a total amount of carbon black and layered silicate not exceeding 90 phr.

29. A method of making a tire tread, comprising preparing a rubber compound by mixing at least one diene rubber, at least one plasticizer and other conventional components for tire tread rubbers with about 5 phr to about 90 phr of at least one layered silicate modified with alkylammonium ions and free of guest molecules that have been polymerized or swelled in by a prior treatment, forming said compound into a tire tread rubber and curing said compound in the presence of a sulfur vulcanizing agent.

30. The method of claim 29, wherein about 40 phr to about 85 phr of the at least one layered silicate are used.

* * * * *